(12) United States Patent
Karuse

(10) Patent No.: US 8,802,305 B2
(45) Date of Patent: Aug. 12, 2014

(54) FUEL CELL SYSTEM AND PROCESSES

(75) Inventor: Bernd Karuse, Liederbach (DE)

(73) Assignee: GM Global Technology Operations LLC, Detroit, MI (US)

( * ) Notice: Subject to any disclaimer, the term of this patent is extended or adjusted under 35 U.S.C. 154(b) by 426 days.

(21) Appl. No.: 12/893,040

(22) Filed: Sep. 29, 2010

(65) Prior Publication Data

US 2012/0077096 A1    Mar. 29, 2012

(51) Int. Cl.
*H01M 8/04* (2006.01)
*H01M 8/06* (2006.01)

(52) U.S. Cl.
USPC .......................................... 429/413; 429/429

(58) Field of Classification Search
None
See application file for complete search history.

(56) References Cited

U.S. PATENT DOCUMENTS

| | | | |
|---|---|---|---|
| 6,514,635 B2 | 2/2003 | Van Dine | |
| 6,835,479 B2 | 12/2004 | Balliet | |
| 6,858,336 B2 | 2/2005 | Reiser | |
| 6,887,599 B2 | 5/2005 | Reiser | |
| 6,913,845 B2 | 7/2005 | Bekkedahl | |
| 2006/0154119 A1* | 7/2006 | Kumar et al. | 429/13 |
| 2008/0075986 A1* | 3/2008 | Salvador et al. | 429/13 |
| 2009/0023040 A1* | 1/2009 | Paik et al. | 429/34 |
| 2009/0246570 A1* | 10/2009 | Hirashige et al. | 429/17 |

* cited by examiner

*Primary Examiner* — Ula C Ruddock
*Assistant Examiner* — Daniel Gatewood
(74) *Attorney, Agent, or Firm* — BrooksGroup

(57) ABSTRACT

A fuel cell system comprises an oxygen removing device having an inlet fluidly connected to at least one of the reactant gas source and an outlet of the cathode gas flow field, and an outlet fluidly connected to each of an anode control valve and a cathode control valve. Various fuel cell operation processes are also disclosed.

23 Claims, 7 Drawing Sheets

US 8,802,305 B2

FUEL CELL SYSTEM AND PROCESSES

TECHNICAL FIELD

The field to which the disclosure generally relates includes fuel cell systems and processes.

BACKGROUND

A fuel cell unit typically comprises an anode, a cathode, and an electrolyte membrane. A reactant gas, such as oxygen gas and air, is supplied to the cathode gas flow field next to the cathode. A fuel gas such as hydrogen gas or methanol is supplied to the anode gas flow field next to the anode. A plurality of fuel cell units can be stacked together by using bipolar plates to form a fuel cell stack. The bipolar plates also include specific patterns of anode and cathode gas flow fields. The anode flow fields of individual fuel cell units in the fuel cell stack can be connected together to form anode gas flow field of the fuel cell stack. Similarly, the cathode gas flow fields of individual fuel cell units can be connected together to form the cathode gas flow field of the fuel cell stack.

When a fuel cell is shut down after normal operation, the supply of fuel gas to the anode is cut off. The anode gas flow field is sometime purged with air to remove potentially hazardous fuel gas from the fuel cell system. When a fuel cell is to be started up, flows of fuel gas to the anode gas flow field and reactant gas to the cathode gas flow field are resumed. Such startup and shutdown processes are found to cause permanent decay of fuel cell performance, particularly, in terms of significant decrease in fuel cell voltage and power output. It is believed that such decay in fuel cell performance is caused by the presence of both an air rich zone and a fuel gas rich zone in the anode gas flow field during startup and shutdown. A reverse current situation or a possible electrochemical reaction generated between the air rich zone and fuel gas rich zone is believed to result in corrosion of the metal catalyst and/or catalyst support at the anode.

SUMMARY OF EXEMPLARY EMBODIMENTS OF THE INVENTION

A fuel cell system comprises a fuel cell stack having a cathode gas flow field and an anode gas flow field; a reactant gas source fluidly connected to an inlet of the cathode gas flow field through a cathode control valve; a fuel gas source fluidly connected to an inlet of the anode gas flow field through an anode control valve; and an oxygen removing device having an inlet fluidly connect to at least one of the reactant gas sources and an outlet of the cathode flow field, and an outlet capable of fluidly communicating with each of the anode gas flow field and the cathode gas flow field.

A fuel cell operating process comprises providing a fuel cell system as described above; flowing a reactant gas through the oxygen removing device from the reactant gas source and/or the outlet of the cathode gas flow field to remove substantially any oxygen gas component, thereby producing a substantially oxygen free gas stream at the outlet of the device; configuring the anode control valve to fluidly connect the outlet of the oxygen removing device to the inlet of the anode gas flow field; purging the anode gas flow field with the substantially oxygen free gas stream so that the anode gas flow field is substantially filled with the oxygen free gas; and optionally purging the cathode gas flow field with the substantially oxygen free gas stream so that the cathode gas flow field is substantially free of oxygen gas. The fuel cell operating process may be used before starting up a fuel cell and before shutting down a fuel cell.

A fuel cell purging process comprises providing an oxygen removing device capable of substantially removing oxygen gas from air or the exhaust gas from the fuel cell cathode gas flow field to provide a substantially oxygen free gas stream; and simultaneously or sequentially purging the anode and the cathode gas flow fields of the fuel cell with the substantially oxygen free gas stream.

Other exemplary embodiments of the present invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses. Unless explicitly stated, the method and process embodiments described herein are not constrained to a particular order or sequence. Additionally, some of the described embodiments or elements thereof can occur or be performed at the same point in time.

Figure 1:
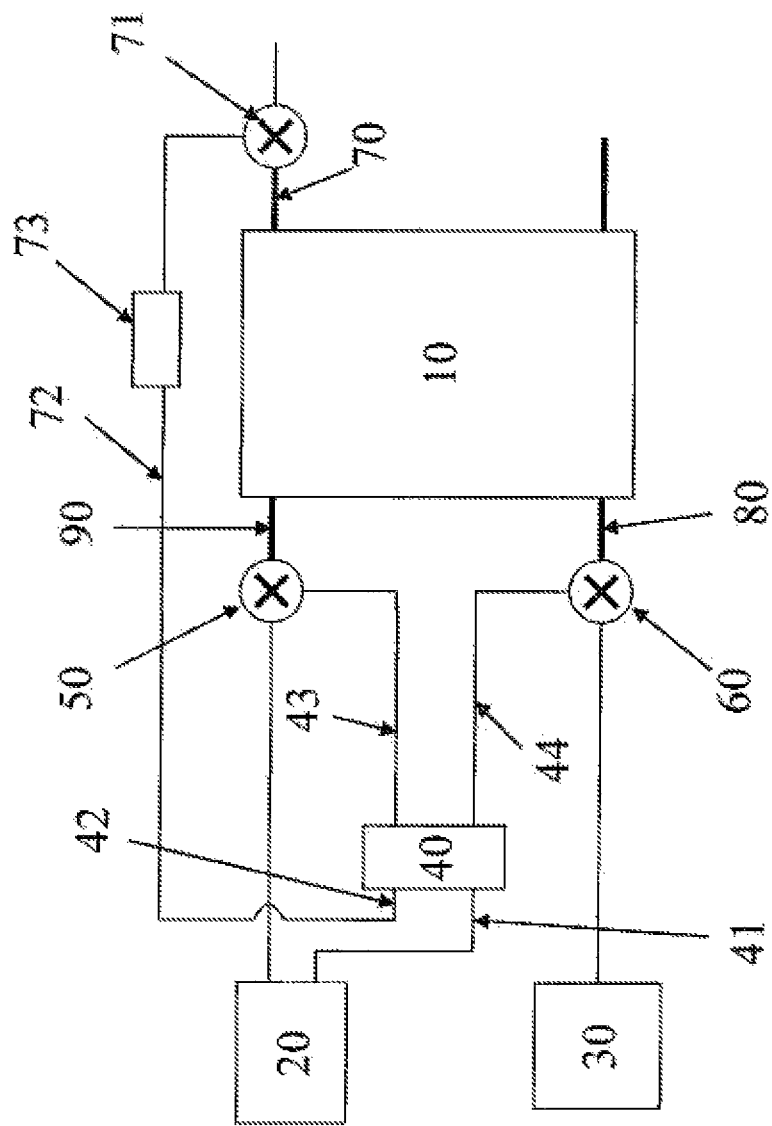
FIG. 1 is a schematic illustration of a fuel cell system according to one embodiment of the invention.

FIG. 1 is a schematic illustration of a fuel cell system according to one embodiment of the invention. The fuel cell system comprises a fuel cell stack 10 having an inlet 80 to an anode gas flow field (not shown in the figure), an inlet 90 and an outlet 70 to a cathode gas flow field (not shown in the figure). The outlet 70 of the cathode gas flow field is fluidly connected to an outlet control valve 71 which can provide fluidly connection and communication to the inlet 42 of an oxygen removing device 40 through a fluid connection line 72. A humidity/temperature control device 73 may be further connected to the connection line 72 to control the humidity and temperature of the gas stream flowing through the connection line 72 to the oxygen removing device 40. The oxygen removing device 40 may optionally and preferably include an inlet 41 fluidly connected to a reactant gas source 20. The reaction gas source 20 is fluidly connected to a cathode control valve 50 which is also fluidly connect to the inlet of cathode gas flow field 90 and an outlet 43 of the oxygen removing device 40. The cathode control valve 50 is typically configured to provide fluid connection between the outlet 43 and the inlet 90, fluid connection between the reactant gas source 20 and the inlet 90, or a complete shut-off of any fluid connection to the inlet 90 of the cathode gas flow field. Similarly, an anode control valve 60 is fluidly connected to an outlet 44 of the oxygen removing device, an inlet 80 of the anode gas flow field and a fuel gas source 30. The anode control valve 60 is typically configured to provide fluid connection between the fuel gas source 30 and the inlet 80, fluid connection between the outlet 44 of the oxygen removing device and the inlet 80, or a complete shut-off of any fluid connection to the inlet 80.

During a normal fuel cell system operation when the fuel cell stack continuously provides electricity to an external load, the control valve 50 is configured to provide only fluid connection between the reactant gas source and the inlet 90 of the cathode gas flow field. Similarly, the control valve 60 is configured to provide only fluid connection between the fuel gas source 30 and the inlet 80 of the anode gas flow field. When the fuel cell stack is ready for shutdown or before the fuel cell stack is started up, the control valve 60 is configured to turn off fluid connection to the fuel gas source, and to provide fluid connection between the outlet 44 of the oxygen removing device and the inlet 80 of the anode gas flow field. A reactant gas such as air from the reactant gas source 20, is allowed to flow through the oxygen removing device that removes substantially oxygen gas component and thereby produces a substantially oxygen free gas stream at the outlets 44 and 43. The substantially oxygen free gas stream may have an oxygen gas content by volume of less than about 10%, 5%, 2%, 1%, 0.5%, 0.1%, or 0.01% depending on the fuel cell stack used and operation requirements. Alternatively or concurrently, the exhaust gas from the cathode gas flow field is configured to flow through the control valve 71, through a humidity/temperature control device 73 and subsequently through the oxygen removing device 40. The substantially oxygen free gas stream may flow through the control valve 60 and enter the anode gas flow field to replace any residue fuel gas or other gas components in the flow field. Optionally and preferably, control valve 50 may be configured to provide fluid connection between the outlet 43 of the oxygen removing device and the inlet 90 of the cathode gas flow field, allowing the substantially oxygen free gas stream produced from the oxygen removing device to replace any residue reactant gas or other gas components in the cathode gas flow field. The directed flow of a substantially oxygen free gas stream through the anode or cathode gas flow field described above is herein referred to as purging of the respective anode and cathode gas flow fields. Purging of the anode and/or cathode gas flow fields is typically and preferably performed before shutdown and start-up of the fuel cell stack.

Purging of the anode gas flow field and purging of the cathode flow field may be performed simultaneously or sequentially. In one embodiment, both purging the anode and purging the cathode gas flow fields are performed simultaneously before shutdown and startup of the fuel cell stack. In another embodiment, before shutdown of the fuel cell stack, purging the cathode gas flow field is performed first to remove substantially any residue oxygen in the cathode flow field before purging the anode gas flow field. Removing residue oxygen in the cathode gas flow field by purging eliminates possible chemically reactive gases and potential electrochemical reactions on the cathode while the anode gas flow field is still filled with a fuel gas. When the anode gas flow field is subsequently purged with a substantially oxygen free gas stream, there is much less a chance of triggering a reverse current or electrochemical reactions because there are no oxidizing gases (such as oxygen) in the cathode or anode. In yet another embodiment, during the startup process of the fuel cell stack, the purging of the anode gas flow field and purging of the cathode flow field are performed first. The control valve 60 is subsequently reconfigured to allow the flow of fuel gas to the anode gas flow field and to completely fill the anode flow field with the fuel gas while the cathode gas flow field is still filled with substantially oxygen free gas stream. Reverse current or potential corrosion of catalyst and catalyst support are minimized during this process due to lack of oxygen in neither anode nor cathode gas flow fields at this point of time. The cathode control valve is subsequently reconfigured to provide flow of the reactant gas (typically and preferably containing oxygen gas) from the reactant gas source to the cathode gas flow field, thereby allowing the fuel cell to resume normal electrochemical reactions to produce electricity. The electrochemical reaction (oxidation of hydrogen gas, for example) occurs uniformly on the anode side in this startup process because the anode gas flow field is completely filled with fuel gas before the reactant gas is introduced to the cathode. Damaging side reactions or corrosions during startup are thus further avoided. An external load may be electrically connected to the fuel cell stack when the normal electrochemical reaction is resumed and electricity is produced by the fuel cell stack. Therefore, various embodiments of the simultaneous purging and sequential purging processes described above eliminate or significantly reduce possible decay of fuel cell performance during fuel cell startup and shutdown.

Figure 2:
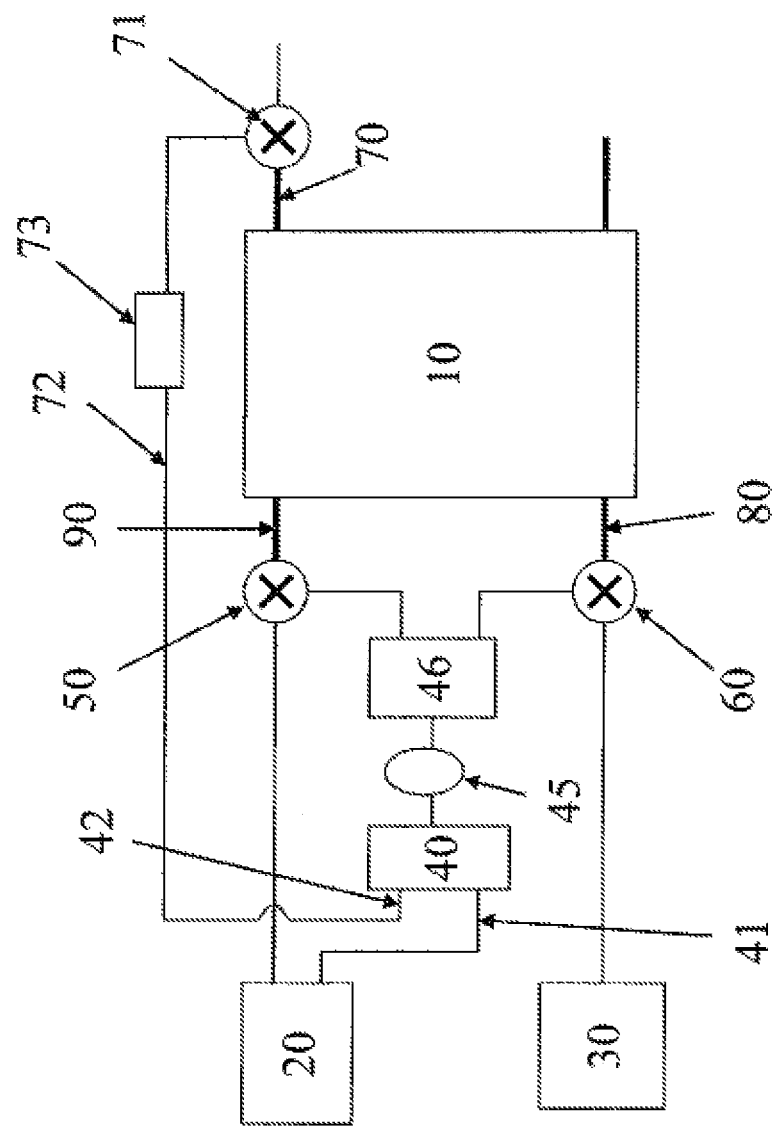
FIG. 2 is a schematic illustration of a fuel cell system according to another embodiment of the invention.

FIG. 2 is a schematic illustration of a fuel cell system according to another embodiment of the invention. As shown in FIG. 2, the fuel cell system is similar to what is shown in FIG. 1, except that a gas pump 45 and a gas storage device 46 are further provided and are fluidly connected to the outlet of the oxygen removing device 40. The gas pump 45 is capable of pulling reactant gas and/or the cathode exhaust gas through the oxygen removing device at a controlled flow rate. The pump may pressurize the substantially oxygen free gas stream produced by the oxygen removing device and allow the pressurized gas to be stored in the gas storage device 46. The gas storage device may be a gas tank, a cylindrical gas holding container, or any other gas storage container known to an ordinary skill in the art. The pressurized gas stored in device 46 can provide higher purging pressure, higher purging gas flow rate, and thus faster gas change-over in the cathode and anode gas flow fields in a purging process. During fuel cell startup and shutdown, fast change-over of gases in the anode and cathode gas flow fields minimizes possible and undesirable side reactions that may result in degradation of fuel cell electrodes and fuel cell performance.

Figure 3:
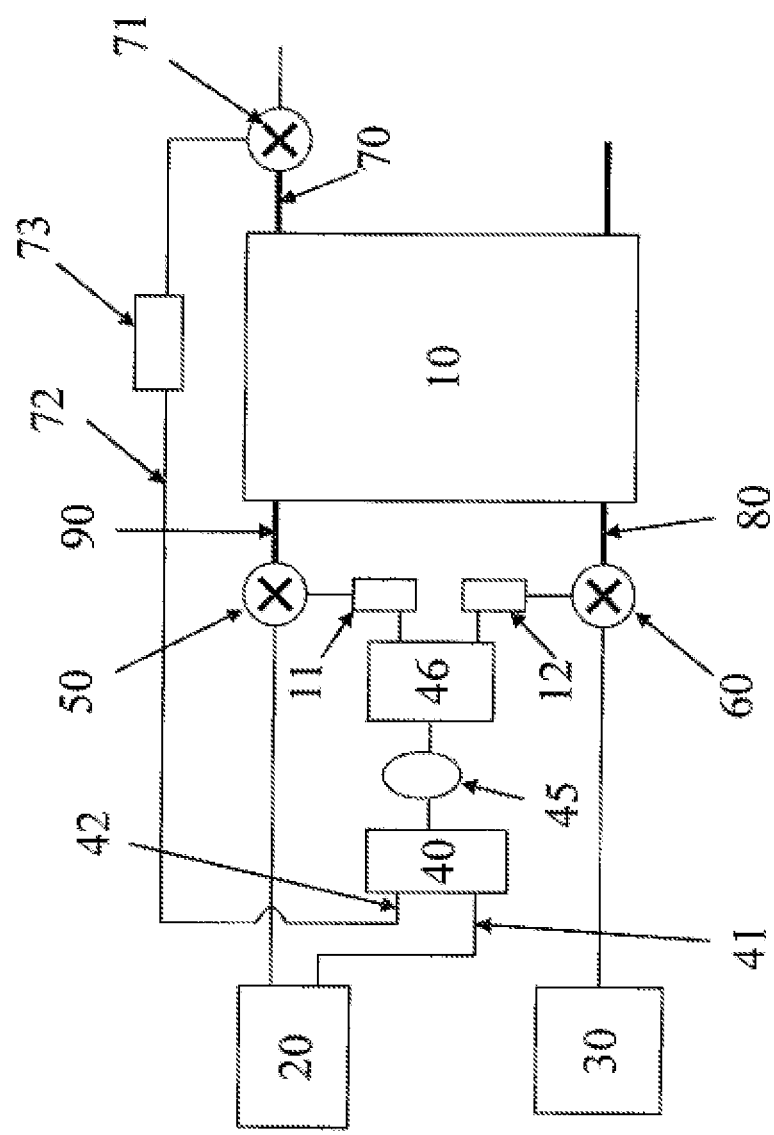
FIG. 3 is a schematic illustration of a fuel cell system according to yet another embodiment of the invention.

FIG. 3 is a schematic illustration of yet another fuel cell system according to another embodiment of the invention. The fuel cell system illustrated in FIG. 3 is similar to the fuel cell system shown in FIG. 2 except that two humidity control devices 11 and 12 are further provided and are each fluidly connect to one of the outlets of gas storage device 46 at one end and one of the corresponding cathode and anode control valves at the other end. The humidity control devices 11 and 12 may provide desired humidity level for the corresponding cathode and anode purging gases depending on the conditions at the cathode and anode. During fuel cell startup or shutdown, for example, the humidity device 11 may further dehumidify the cathode purging gas stream so that the purging gas flowing through the cathode gas flow field can effectively remove any extra water produced at the cathode during normal fuel cell operation to prevent flooding or formation of ice on the cathode in cold weather. On the other hand, the humidity control device 12 may further humidify (adding moisture to) the purging gas stream supplied to the anode gas flow field, to avoid excessive moisture loss from the electrolyte layer or membrane.

There is no limitation to the fuel cell stack included in the fuel cell system and fuel cell processes. Any fuel cell stacks, known, conceived or available to an ordinary skill in the art, may be used. The fuel cell stack may comprise a plurality of individual fuel cell units, each of which comprises an anode, a cathode and an electrolyte layer or membrane disposed between the anode and the cathode. Each of the cathode and anode may comprise a catalyst and a catalyst support. The catalyst may comprises at least one of a Pt, Pd, Rh, Ru, Mn, Au, Fe, Co, Ni, Ti, V, alloys, oxide, or organic complex of transition metal elements and noble metal elements. The catalyst may be supported on conductive carbon, metal oxide, or mixture thereof. The electrolyte layer or membrane may comprise any materials that provide sufficient ionic conductivity and barrier to prevent cross flow of a fuel gas from anode side to the cathode side or reactant gas from the cathode side to the anode side. The electrolyte membrane may be a proton conductive membrane made from a proton conductive polymer such as perfluorinated polymers containing sulfonic acid groups. Bipolar plates and end plates may be used to connect the individual fuel cell units together and to provide specific patterns of anode and cathode gas flow fields.

Various reactant gases may be suitably used based on the type of fuel cell stack and the operating conditions for a specific fuel cell system. Typically and preferably, the reactant gas is an oxygen containing gas mixture. Examples of reactant gas may include air, purified air that exclude dust particles and sulfur containing contaminants, oxygen gas, oxygen enriched air, and a mixture of oxygen and nitrogen gas. The reactant gas source that provides the reactant gas may include filters, humidity control devices, temperature controlled devices, and contaminants removing devices to provide reactant gas stream suitable for fuel cell operation.

The fuel gas may include any gases or gas mixtures suitable for the anode side of electrochemical reaction in a fuel cell system. Exemplary fuel gases may include hydrogen gas, methanol, and any hydrogen containing gas mixtures. The fuel gas is typically and preferably free of oxygen or other oxidizing gases.

Figure 4:
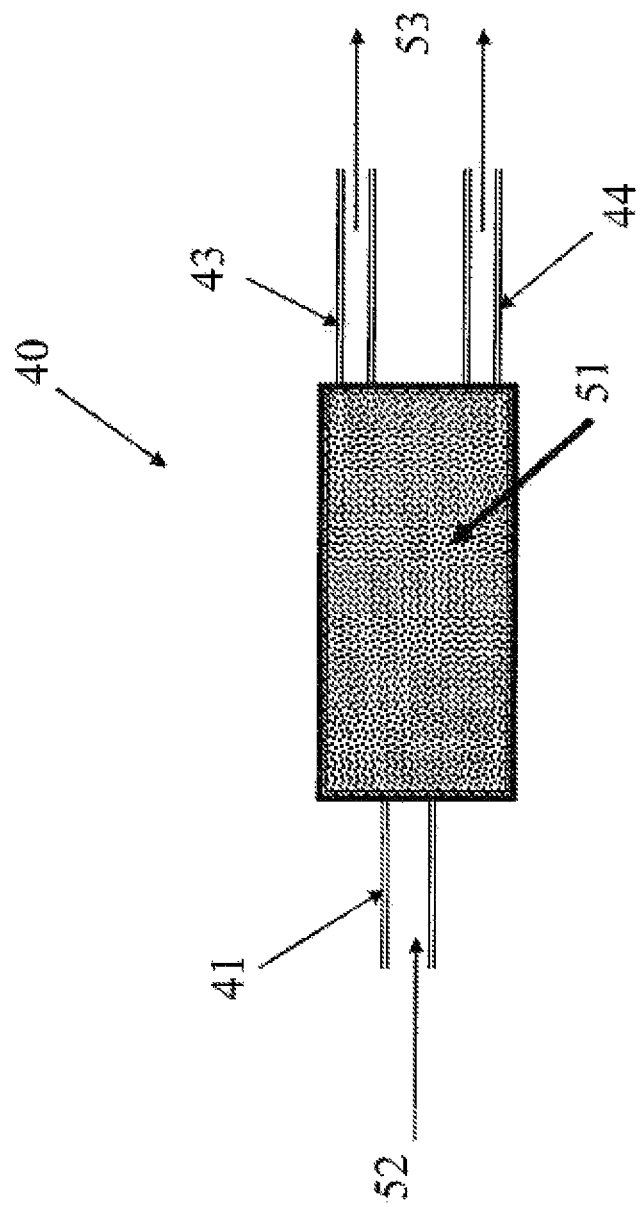
FIG. 4 is a schematic illustration of an oxygen removing device according to one embodiment of the invention.

The oxygen removing device may be any devices that allow a reactant gas to readily pass through the device and substantially remove oxygen content in the reactant gas. As illustrated schematically in FIG. 4 for an example, the oxygen removing device 40 may comprise a gas inlet 41, gas outlets 43, 44 and an oxygen removing medium 51 disposed between the inlet and the outlets. The oxygen removing medium typically has a high surface area configured to provide sufficient contact with the reactant gas stream 52 that passes through the oxygen removing device, and to selectively adsorb, absorb, or chemically react with oxygen gas in the reactant gas stream. Accordingly, gas streams 53 can be obtained substantially free of oxygen gas at the outlets of the device.

The oxygen removing medium may be in the form of a gas permeable foam, porous web, network of honeycombs, fluidized bed, oxygen reacting liquid trap, or particulates packed in a gas impermeable column. The oxygen removing medium may comprises any materials that are capable of adsorbing, absorbing, or chemically reacting with oxygen gas in the reactant gas stream. Exemplary oxygen removing media may include, but not limited to, oxidizable metals, activated carbon, metal alloys, oxides, hydroxides, metal chelates, metal hydrides, organic hydrides, oxidizable metal complexes, metallocenes, organic reducing agents, phosphites, and any other oxygen adsorbing or reacting materials conceivable to an ordinary skills in the art. Oxidizable metals may include, for example, at least one of Fe, Zn, Al, Mg, Co, Ni, Cu, Ru, Rh, Pd, Ag, Sn, Sb, Ce, W, In and Ge. The oxides of oxidizable metals, and oxides of Si may also be used alone or in combination with other suitable materials. Exemplary oxides may include $Cu_2O$, $FeO$, $Co_2O$, $CoO$, $Co_2O_3$, $CeO$, $SnO$, and $NiO$. Any metal chelates with a metal center at the metal's lower valent state may be included in an oxygen removing medium. Metal chelates of Co(I), Co(II), Co(III), Cu(I), Ce(II), Sn(II), Fe(II), and Ni(II), for example, may be used alone, as a coating or deposit on a porous carrier. An example of cobalt chelate, is [5,5'-(1,2-ethanediyldinitrilo)bis(2,2,7-trimethyl-3-octanato)]cobalt(II) which can reversibly adsorb and release oxygen. This metal chelate can be prepared from "keto-amino"-type Schiff bases resulting from the condensation of β-diketone and 1,2-diaminoethane. Another group of exemplary reversible oxygen adsorbers are based on Sr—Co—Fe based perovskite type oxides, such as $SrCo_{0.5}Fe_{0.5}O_3$. Organic reducing agents may include phenols, hydroquinones, amines, aldehydes, unsaturated hydrocarbons, pyrogallol, nitrides, and other reducing agent known to an ordinary skill in the art. In one embodiment, the oxygen removing medium is an adsorbent bed containing CeO. In another embodiment, the oxygen removing medium is a packed gas permeable column loaded with porous material containing high surface area Cu metal or $Cu^+$ oxide or other $Cu^+$ compounds. Hydrides, such as $BH_3$, $NaBH_4$, $CaH_2$, $NaH$, $NaAlH_4$, $MgH_2$, hydrazine, and carbohydrides, may also be included in the oxygen removing medium. A commercially available oxygen trap under the trade name Deoxygen tube (by GL Sciences, Inc, Torrance, Calif.) containing packed calcium hydride, for example, may be used as an oxygen removing device. Another group of compounds that can be used as oxygen removing medium according to one embodiment of this invention includes metallocenes. A metallocene may be described as an LM, where L is a substituted or unsubstituted cyclopentadienyl, indenyl or fluorenyl moiety, and M is from the group of transition metals Group IVB, (e.g., titanium, zirconium, hafnium), Group VB (e.g., vanadium, niobium, tantalum), Group VIIIB (e.g., iron, cobalt, nickel, ruthenium), and the lanthanide series (e.g., lanthanum). In all metallocenes, the various metallic species interact with a cyclopentadienyl moiety, which is either part of a larger organic structure (e.g., indenyl or fluorenyl) or with a simple cyclopentadienyl moiety (e.g., $C_5H_5$). The metallocene may be homogeneous (e.g., dicyclopentadienyl, diindenyl or difluorenyl), or heterogeneous (e.g., cyclopentadienyl-indenylcyclopentadienyl-fluorenyl with a metallic atom sandwiched between). Examples of metallocenes include, but not limited to, ferrocenes, zirconocenes, hafnocenes, ruthenocenes, and titanocenes (e.g., fluorenyl zirconium compounds such as the dicyclopentadienyl-difluorenyl zirconium, dicyclopentadienyl titanium dichloride, dicyclopentadienyl zirconium dichloride or dicyclopentadienyl titanium dichloride), among others (e.g., bis(ethylcyclopentadienyl) chromium, bis(ethylcyclopentadienyl) manganese, tris (tetramethylcyclopentadienyl)-erbium, and bis(ethylcyclopentadienyl) nickel). The metallocene or other oxygen removing material may be supported on a porous media. Examples of a porous support include, but are not limited to, porous silica, metal mesh (e.g., stainless steel wire mesh), a carbon-based (e.g., graphite, activated carbon) particulates, fiber cloth, glass cloth, glass wool, silicon carbide foam, etc. The reactant gas stream can flow through the porous support. Thickness of the porous support determines the tortuosity path for the gas stream to pass through. An oxygen-adsorbed metallocene may be regenerated. During regeneration, oxygen is desorbed from the metallocene. The metallocene may be regenerated by exposing the metallocene to light (ultraviolet or visible), or heating the metallocene to a high temperature (above 200° C.), or both. Heating may be performed with infrared heaters or with heating elements in a regenerating chamber off-board. Heater may be included in the oxygen removing device to allow on-board regeneration. Alternatively oxygen removing device or medium may be replaced as needed.

Figure 5:
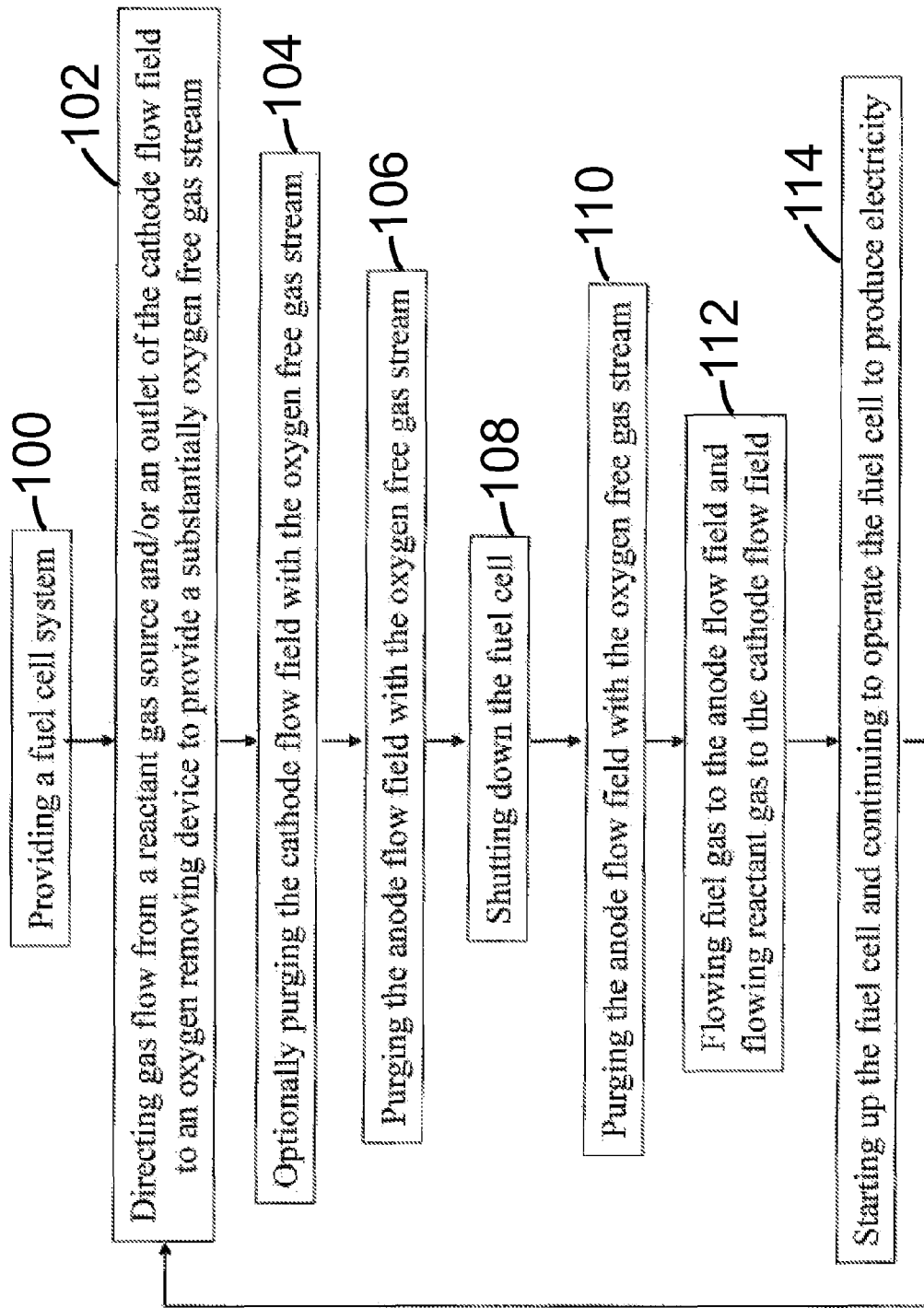
FIG. 5 is an exemplary flow chart illustrating a fuel cell process according to one embodiment of the invention.

FIG. 5 is an exemplary flow chart illustrating a fuel cell process according to one embodiment of the invention. In one embodiment, a process comprises providing a fuel cell system as described above; directing gas flow from a reactant gas source and/or an outlet of the cathode flow field to an oxygen removing device to provide a substantially oxygen free gas stream; optionally purging the cathode flow field with the oxygen free gas stream; purging the anode flow field with the oxygen free gas stream; shutting down the fuel cell. In another embodiment, before shutting down the fuel cell, the anode and cathode gas flow fields may be simultaneously or sequentially purged with the substantially oxygen free gas stream. In an exemplary sequential purging process, the cathode gas flow field may be first purged before the anode gas flow field be purged, or vice versa. To start up a fuel cell according to one embodiment, a process comprises purging the anode flow field with the oxygen free gas stream; flowing fuel gas to the anode flow field and flowing reactant gas to the cathode flow field.

Figure 6:
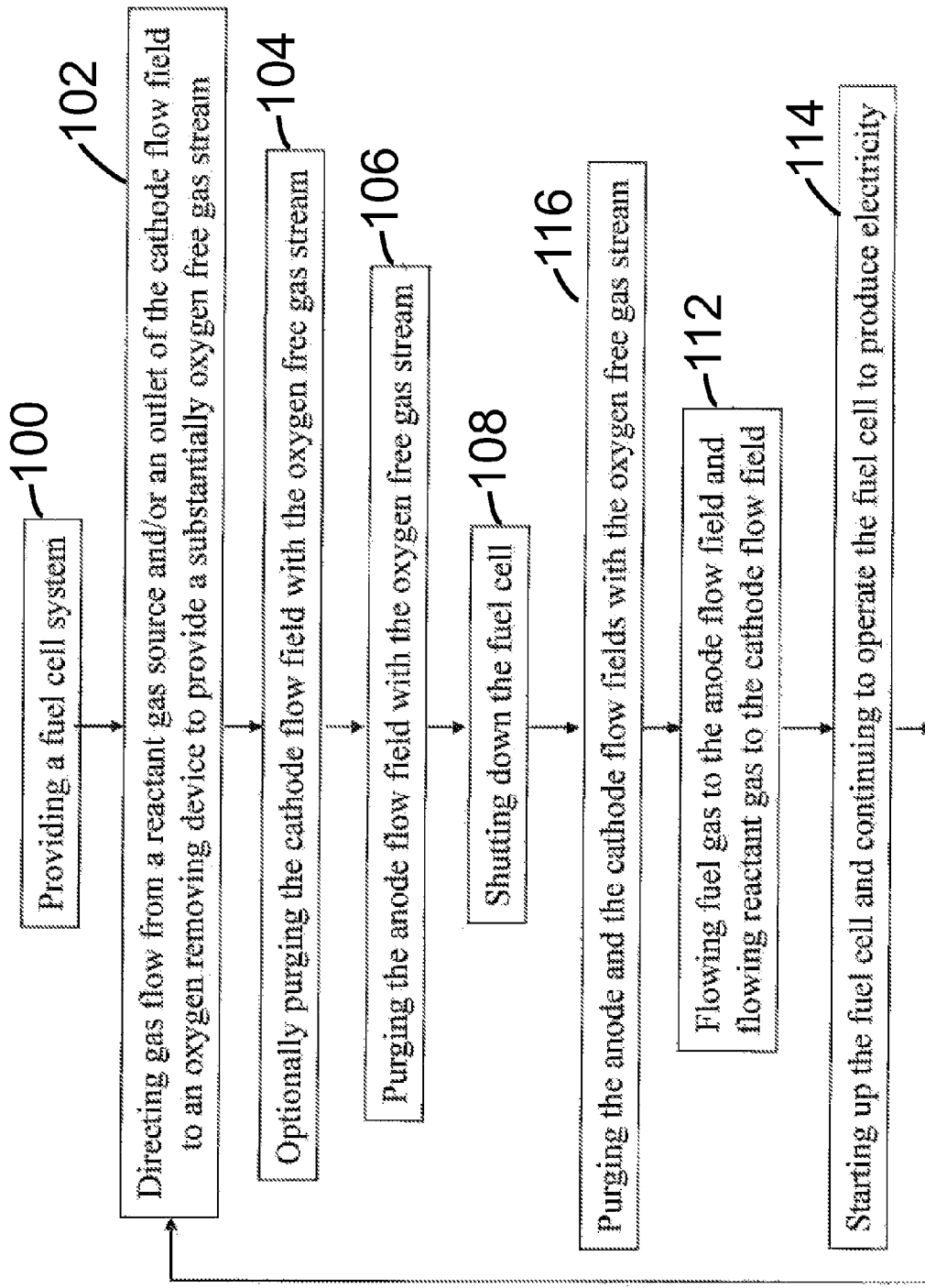
FIG. 6 is an exemplary flow chart illustrating a fuel cell process according to another embodiment of the invention.

FIG. 6 is an exemplary flow chart illustrating a fuel cell process according to another embodiment of the invention. To start up a fuel cell according to another embodiment, a process comprises simultaneous purging the anode and cathode flow fields with the oxygen free gas stream; flowing fuel gas to the anode gas flow field and flowing reactant gas to the cathode gas flow field.

Figure 7:
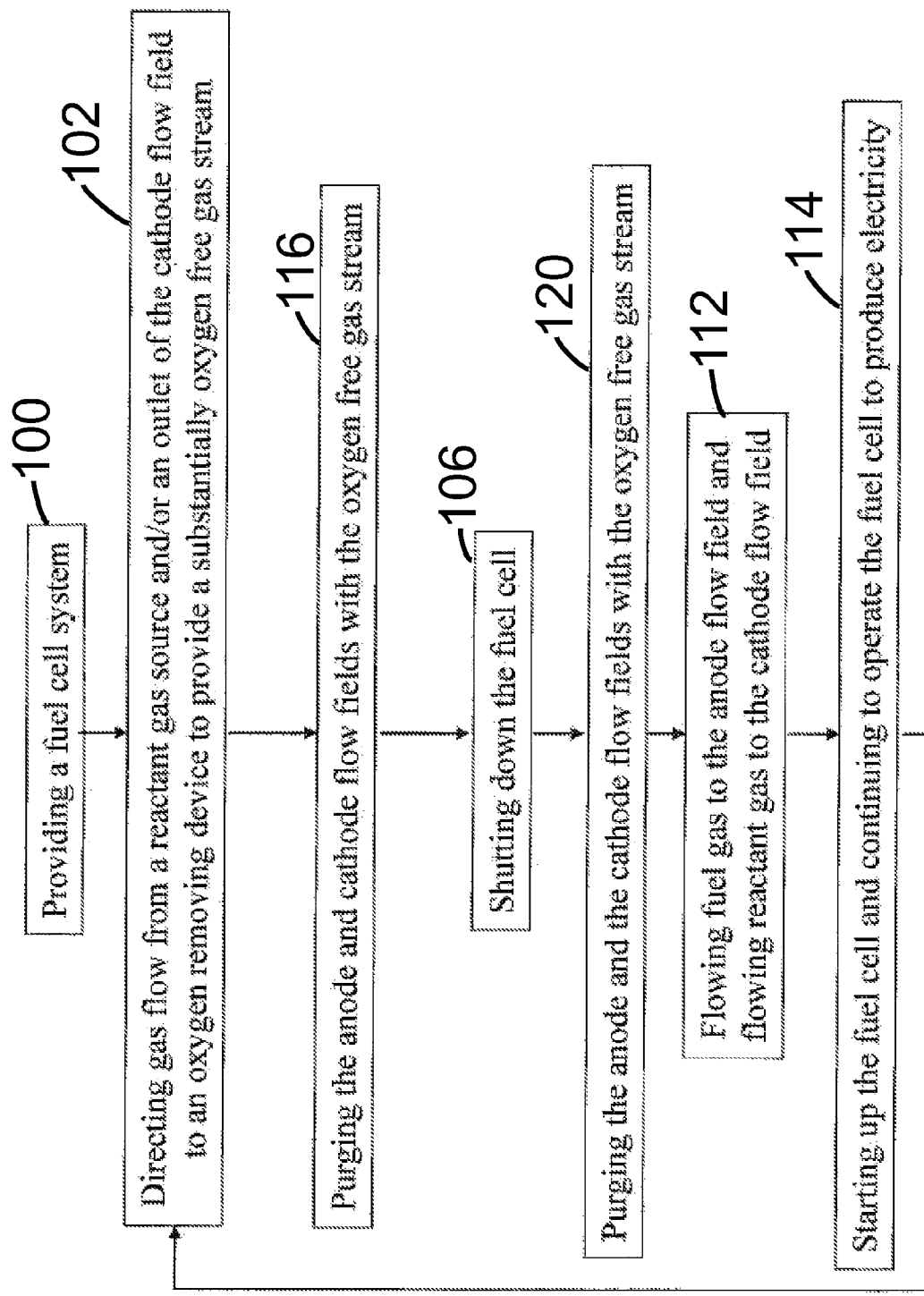
FIG. 7 is an exemplary flow chart illustrating a fuel cell process according to yet another embodiment of the invention.

FIG. 7 is an exemplary flow chart illustrating a fuel cell process according to yet another embodiment of the invention. In one embodiment, a process comprises providing a fuel cell system as described above; directing gas flow from a reactant gas source and/or an outlet of the cathode flow field to an oxygen removing device to provide a substantially oxygen free gas stream; simultaneously purging the anode and cathode flow fields with the oxygen free gas stream; and shutting down the fuel cell. To start up the fuel cell according to various embodiments, the anode and cathode flow fields can be sequentially or simultaneously purged with the substantially oxygen free gas stream. For example, the cathode may be first purged with the substantially oxygen free gas stream or the anode may be first purged with the same gas stream. After the cathode and the anode gas flow fields have been purged, the fuel gas may be allowed to flow to and fill the anode gas flow field before a reactant gas starts to flow to the cathode gas flow field. Potential degradation of the fuel cell performance can be prevented by the process.

The above description of embodiments of the invention is merely exemplary in nature and, thus, variations thereof are not to be regarded as a departure from the spirit and scope of the invention.

What is claimed is:

1. A process comprising:
providing a fuel cell system comprising a fuel cell stack having a cathode gas flow field, an anode gas flow field, a reactant gas source fluidly connected to an inlet of the cathode gas flow field through a cathode control valve, a fuel gas source fluidly connected to an inlet of the anode gas flow field through an anode control valve, an oxygen removing device having an inlet fluidly connect to at least one of the reactant gas source and an outlet of the cathode flow field and an outlet capable of fluidly communicating with each of said anode gas flow field and said cathode gas flow field;
providing flow of a reactant gas through the oxygen removing device from the reactant gas source and/or the outlet of the cathode gas flow field to remove substantially any oxygen gas component, thereby producing a substantially oxygen free gas stream at the outlet of said device;
configuring said anode control valve to fluidly connect the outlet of the oxygen removing device to the inlet of the anode gas flow field;
purging said anode gas flow field with said substantially oxygen free gas stream so that the anode gas flow field is filled with said oxygen free gas; and
before shutdown of the fuel cell stack purging said cathode gas flow field with said substantially oxygen free gas stream so that the cathode gas flow field is substantially free of oxygen gas.

2. A process as set forth in claim 1, wherein said reactant gas is substantially air and said fuel gas is substantially hydrogen gas.

3. A process as set forth in claim 1, wherein purging said cathode gas flow field and purging said anode gas flow field are performed simultaneously.

4. A process as set forth in claim 1, wherein purging said cathode gas flow field is performed before purging said anode gas flow field.

5. A process as set forth in claim 1 further comprising reconfiguring said anode control valve such that only said fuel gas source is fluidly communicating with said anode gas flow field; reconfiguring said cathode control valve such that only the reactant gas source is fluidly communicating with said cathode gas flow field; flowing said fuel gas to said anode gas flow field and flowing said reactant gas to said cathode gas flow field.

6. A process as set forth in claim 5 further comprising electrically connecting an external load to said fuel cell stack and providing electricity to said external load.

7. A process as set forth in claim 5, wherein the flow rate of said oxygen free gas stream through said anode gas flow field is greater than that of said fuel gas through said anode gas flow field.

8. A process as set forth in claim 5 wherein the flowing said fuel gas to said anode gas flow field is performed before the flowing said reactant gas to the said cathode gas flow field.

9. A process as set forth in claim 1 further comprising dehumidifying said oxygen free gas stream provided to said cathode gas flow field.

10. A process as set forth in claim 1 further comprising humidifying said oxygen free gas stream provided to said anode gas flow field.

11. A process as set forth in claim 1 wherein said oxygen removing device comprising an oxygen removing medium configured to effectively contact said reactant gas flowing through said device and to selectively adsorb, absorb, or chemically react with oxygen gas to substantially remove oxygen gas from the reactant gas.

12. A process as set forth in claim 11 wherein said oxygen removing device can be regenerated or replaced.

13. A process of purging a fuel cell comprising:
providing an oxygen removing device capable of substantially removing oxygen gas from air or the exhaust gas stream from a fuel cell cathode exhaust gas to provide a substantially oxygen free gas stream; and before shutdown of the fuel cell stack simultaneously or sequentially purging the anode and the cathode gas flow fields of the fuel cell with said oxygen free gas stream.

14. A process as set forth in claim 13 wherein the purging of the anode and cathode gas flow fields is performed simultaneously.

15. A process as set forth in claim 13 wherein the purging of the cathode gas flow field is performed before the purging of the anode gas flow field.

16. A process as set forth in claim 13 further comprising shutting down said fuel cell.

17. A process as set forth in claim 13 further comprising flowing a fuel gas to said anode gas flow field, flowing a reactant gas comprising oxygen to said cathode gas flow field, and electrically connecting said fuel cell to an external load.

18. A process comprising:
providing a fuel cell system comprising a fuel cell stack having a cathode gas flow field, an anode gas flow field, a reactant gas source fluidly connected to an inlet of the cathode gas flow field through a cathode control valve, a fuel gas source fluidly connected to an inlet of the anode gas flow field through an anode control valve, an oxygen removing device having an inlet fluidly connected to at least one of the reactant gas source and an outlet of the cathode flow field and an outlet that fluidly communicates with each of said anode gas flow field and said cathode gas flow field and a gas pump and a gas storage device that are fluidly connected to the outlet of the oxygen removing device;
providing flow of a reactant gas through the oxygen removing device from the reactant gas source and/or the outlet of the cathode gas flow field to remove substantially any oxygen gas component, thereby producing a substantially oxygen free gas stream at the outlet of said device;
configuring said anode control valve to fluidly connect the outlet of the oxygen removing device to the inlet of the anode gas flow field;
purging said anode gas flow field with said substantially oxygen free gas stream so that the anode gas flow field is filled with said oxygen free gas; and
purging said cathode gas flow field with said substantially oxygen free gas stream so that the cathode gas flow field is substantially free of oxygen gas.

19. A process of purging a fuel cell comprising:
providing an oxygen removing device capable of substantially removing oxygen gas from air or the exhaust gas stream from a fuel cell cathode exhaust gas to provide a substantially oxygen free gas stream; and
sequentially purging the anode and the cathode gas flow fields of the fuel cell with said oxygen free gas stream.

20. A process of purging a fuel cell comprising:
providing an oxygen removing device capable of substantially removing oxygen gas from air or the exhaust gas stream from a fuel cell cathode exhaust gas to provide a substantially oxygen free gas stream; and
before shutdown of the fuel cell, sequentially purging the cathode gas flow field and thereafter the anode gas flow field of the fuel cell with said oxygen free gas stream.

21. A process of purging a fuel cell comprising:
providing an oxygen removing device capable of substantially removing oxygen gas from air or the exhaust gas stream from a fuel cell cathode exhaust gas to provide a substantially oxygen free gas stream; and
simultaneously purging the anode and the cathode gas flow fields of the fuel cell with said oxygen free gas stream.

22. A process of purging a fuel cell comprising:
providing an oxygen removing device capable of substantially removing oxygen gas from air or the exhaust gas stream from a fuel cell cathode exhaust gas to provide a substantially oxygen free gas stream; and
before shutdown of the fuel cell, simultaneously purging the cathode gas flow field and thereafter the anode gas flow field of the fuel cell with said oxygen free gas stream.

23. A process of purging a fuel cell comprising:
providing an oxygen removing device capable of substantially removing oxygen gas from air or the exhaust gas stream from a fuel cell cathode exhaust gas to provide a substantially oxygen free gas stream;
providing a gas pump and gas storage device wherein the gas pump is capable of pulling air or the exhaust gas stream from the fuel cell cathode exhaust gas through the oxygen removing device at a controlled flowrate and pressurizing the substantially oxygen free gas stream and allowing for storage of the pressurized gas in the gas storage device; and
simultaneously or sequentially purging the anode and the cathode gas flow fields of the fuel cell with said oxygen free gas stream.

* * * * *

UNITED STATES PATENT AND TRADEMARK OFFICE
CERTIFICATE OF CORRECTION

PATENT NO. : 8,802,305 B2  
APPLICATION NO. : 12/893040  
DATED : August 12, 2014  
INVENTOR(S) : Bernd Krause Page 1 of 1

It is certified that error appears in the above-identified patent and that said Letters Patent is hereby corrected as shown below:

On The Title Page, item (75) Inventor, last name of the inventor should read "Krause".

Signed and Sealed this
Seventeenth Day of March, 2015

Michelle K. Lee
*Director of the United States Patent and Trademark Office*